(12) United States Patent
Takahashi

(10) Patent No.: US 12,420,599 B2
(45) Date of Patent: Sep. 23, 2025

(54) PNEUMATIC TIRE AND GREEN TIRE MANUFACTURING METHOD

(71) Applicant: The Yokohama Rubber Co., LTD., Tokyo (JP)

(72) Inventor: Natsumi Takahashi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 28 days.

(21) Appl. No.: 17/753,418

(22) PCT Filed: Aug. 31, 2020

(86) PCT No.: PCT/JP2020/032924
§ 371 (c)(1),
(2) Date: Mar. 2, 2022

(87) PCT Pub. No.: WO2021/045015
PCT Pub. Date: Mar. 11, 2021

(65) Prior Publication Data
US 2022/0288976 A1 Sep. 15, 2022

(30) Foreign Application Priority Data
Sep. 3, 2019 (JP) .................. 2019-160624

(51) Int. Cl.
*B60C 19/08* (2006.01)
*B29D 30/52* (2006.01)

(52) U.S. Cl.
CPC ............ *B60C 19/082* (2013.01); *B29D 30/52* (2013.01); *B29D 2030/526* (2013.01)

(58) Field of Classification Search
CPC ..... B60C 19/08; B60C 19/082; B60C 11/033; B60C 11/0332; B60C 11/1376; B29D 30/52; B29D 2030/526
USPC ...................................... 152/152.1
See application file for complete search history.

(56) References Cited

U.S. PATENT DOCUMENTS

| 6,269,854 B1 | 8/2001 | Matsuo et al. | |
| 2008/0308203 A1* | 12/2008 | Kunisawa | B60C 19/08 152/152.1 |
| 2010/0243115 A1* | 9/2010 | Wada | B60C 19/08 152/152.1 |

(Continued)

FOREIGN PATENT DOCUMENTS

| CN | 102642318 A | 8/2012 |
| CN | 108290464 A | 7/2018 |

(Continued)

OTHER PUBLICATIONS

Hashimoto Y, JP-2017109526-A, machine translation. (Year: 2017).*

(Continued)

*Primary Examiner* — Sedef E Paquette
(74) *Attorney, Agent, or Firm* — Thorpe North & Western

(57) ABSTRACT

With a pneumatic tire mounted on a regular rim, inflated to a regular internal pressure, and in an unloaded state, in a tire meridian cross-sectional view, electrically conductive rubber is formed in a region corresponding to a bulging land portion except for a region with a width of 5% of a width of the bulging land portion and being centered at a bulging apex position bulging most toward an outer side of the bulging land portion in a tire radial direction.

12 Claims, 5 Drawing Sheets

(56) References Cited

U.S. PATENT DOCUMENTS

| | | | |
|---|---|---|---|
| 2011/0024017 A1* | 2/2011 | Miyazaki | B60C 19/08 152/564 |
| 2015/0158344 A1* | 6/2015 | Kishizoe | B60C 19/084 152/152.1 |
| 2015/0328941 A1* | 11/2015 | Hirosue | B60C 19/084 152/539 |
| 2016/0009142 A1* | 1/2016 | Tada | B60C 11/04 152/209.15 |
| 2017/0259626 A1* | 9/2017 | Hata | B60C 11/005 |
| 2018/0141383 A1* | 5/2018 | Binder | B60C 9/005 |
| 2018/0339559 A1 | 11/2018 | Kendziorra et al. | |
| 2021/0237519 A1* | 8/2021 | Kondo | B60C 19/084 |

FOREIGN PATENT DOCUMENTS

| | | | | |
|---|---|---|---|---|
| EP | 3492284 A1 * | 6/2019 | | B60C 11/24 |
| JP | 11-011121 A | 1/1999 | | |
| JP | 11-180108 A | 7/1999 | | |
| JP | 2003-211913 A | 7/2003 | | |
| JP | 2005-319890 A | 11/2005 | | |
| JP | 2009023504 A * | 2/2009 | | |
| JP | 2013-79049 A | 5/2013 | | |
| JP | 2015147545 A * | 8/2015 | | B60C 11/1376 |
| JP | 2016055721 A * | 4/2016 | | |
| JP | 2017-30429 A | 2/2017 | | |
| JP | 2017-105361 A | 6/2017 | | |
| JP | 2017109526 A * | 6/2017 | | |
| JP | 2018065438 A * | 4/2018 | | |
| JP | 2018-154187 A | 10/2018 | | |
| KR | 100453201 B1 * | 10/2004 | | |
| WO | 2014/049862 A1 | 4/2014 | | |
| WO | 2016/067533 A1 | 5/2016 | | |
| WO | 2018/043055 A1 | 3/2018 | | |

OTHER PUBLICATIONS

Jung Hyo Jun, KR-100453201-B1, machine translation. (Year: 2004).*
Nagase H, JP-2015147545-A, machine translation. (Year: 2015).*
Kubo Naoya, JP-2018065438-A, machine translation. (Year: 2018).*
Ogawa Takahiro, JP-2016055721-A, machine translation. (Year: 2016).*
Iizuka Toru, JP-2009023504-A, machine translation. (Year: 2009).*

* cited by examiner

PNEUMATIC TIRE AND GREEN TIRE MANUFACTURING METHOD

TECHNICAL FIELD

The present technology relates to a pneumatic tire providing enhanced electrical conductivity performance while maintaining wet steering stability performance and rolling resistance performance. The present technology also relates to a green tire manufacturing method used in manufacturing such a pneumatic tire.

BACKGROUND ART

A tire rolling resistance opposes a gripping force. The gripping force is particularly weak on a wet road surface where the rolling resistance is relatively low. Thus, in the related art, there has been a demand to provide both wet steering stability performance and low rolling resistance coefficient (RRC) in a compatible manner.

As an approach to improving wet steering stability performance, a technology is known in which ribs are bulged to enhance drainage performance while making a contact patch shape uniform. In contrast, as an approach to reducing the RRC, a technology is known that increases the silica content of rubber compounds forming cap tread rubber, undertread rubber, sidewall rubber, and the like.

However, silica is a substance having excellent insulating properties, and thus silica-containing rubber such as the cap tread rubber may have an increased resistance value, and the electrostatic charging prevention function of the tire may be degraded. Thus, in recent years, a technology is known in which an electrically conductive rubber is disposed in a tread portion to impart an electrostatic charging prevention function to the tire.

For example, the tread portion is provided with a main groove continuously extending in the tire circumferential direction, and a land portion defined by the main groove, the land portion including, in a horizontal cross section including a tire rotation axis, a first edge, a second edge, a road contact surface located between the first edge and the second edge and having an arc profile that protrudes toward the outer side in the tire radial direction, and an electrically conductive portion made of electrically conductive rubber, the electrically conductive portion being inclined toward the first edge side and extending from an inner end in the tire radial direction toward an outer end in the tire radial direction, the outer end being exposed from the road contact surface, the inner end being connected to a tire internal structure material electrically connected to a rim when the tire is mounted on the rim, and on the road contact surface, a center position of the outer end in the tire axial direction being located on a center position of the land portion in the tire axial direction or located further on the first edge side than the central portion (Japan Unexamined Patent Publication No. 2018-154187).

Normally, from the time when the tire is new until the terminal stages of wear, the position in the tire width direction of a portion of each land portion having the highest ground contact pressure is not substantially changed. However, in view of FIG. 3, FIG. 6, and the like described in Japan Unexamined Patent Publication No. 2018-154187, the position in the tire width direction changes as an electrically conductive portion 23 moves in the tire radial direction. Thus, in the technology described in Japan Unexamined Patent Publication No. 2018-154187, the electrically conductive portion 23 may not be present in a portion with a high ground contact pressure from the time when the tire is new until the terminal stages of wear, and furthermore, excellent electrical conductivity performance may fail to be sustainably achieved.

Additionally, in adopting the technology described in Japan Unexamined Patent Publication No. 2018-154187, in order to efficiently impart the tire electrostatic charging prevention function, it is crucial to form an electrically conductive portion in a region including a position where the tire bulges most in the tire radial direction (hereinafter referred to as a maximum bulging region), the region corresponding to a region that is most likely to contact the road surface.

However, the maximum bulging region is a region contacted by a mold at the end of vulcanization, and thus unvulcanized rubber, which is present around the region and which is non-electrically-conductive, is assumed to flow into the maximum bulging portion. Thus, the electrically conductive portion, which should otherwise be exposed, is buried, and the excellent electrical conductive performance may fail to be ensured particularly in a case where the tire is new.

SUMMARY

The present technology provides a pneumatic tire providing further enhanced electrical conductivity performance while maintaining wet steering stability performance and rolling resistance performance.

A pneumatic tire according to an embodiment of the present technology is a pneumatic tire including at least two circumferential main grooves and at least one land portion defined and formed by the at least two circumferential main grooves, the at least one land portion being a bulging land portion bulging toward an outer side in a tire radial direction with respect to a reference arc, the pneumatic tire further including a tread portion formed of non-electrically-conductive rubber and electrically conductive rubber, when the pneumatic tire is mounted on a regular rim, inflated to a regular internal pressure, and in an unloaded state, in a tire meridian cross-sectional view, the electrically conductive rubber being formed in a region corresponding to the bulging land portion except for a region with a width of 5% of a width of the bulging land portion and being centered at a bulging apex position bulging most toward an outer side of the bulging land portion in the tire radial direction, and the reference arc being an arc passing through at least three of four opening ends of two circumferential main grooves adjacent to the land portion in the tire width direction and including a center located further on an inner side than the opening ends in the tire radial direction and having a maximum radius of curvature, or the reference arc being an arc passing through two opening ends and a ground contact edge of a circumferential main groove adjacent to the land portion on the inner side in the tire width direction and including a center located further on the inner side than the opening ends in the tire radial direction and having a maximum radius of curvature.

In the pneumatic tire according to an embodiment of the present technology, based on the formation of the bulging land portion and the inclusion of the electrically conductive rubber in the tread portion, the region of the bulging land portion where the electrically conductive rubber is formed is improved. As a result, the pneumatic tire according to an embodiment of the present technology can provide enhanced electrical conductivity performance, while maintaining wet steering stability performance and rolling resistance performance.

DETAILED DESCRIPTION

Embodiments of a pneumatic tire according to the present technology (Basic Embodiment and Additional Embodiments 1 to 6) and embodiments of a green tire manufacturing method according to the present technology will be described in detail below based on the drawings. Note that the present technology is not limited to these embodiments. Constituents of the embodiments include components that are substantially identical or that can be substituted or easily conceived by one skilled in the art. In addition, various modes included in the embodiments can be combined as desired within the scope of obviousness by one skilled in the art.

Pneumatic Tire

Basic Embodiment

The Basic Embodiment of the pneumatic tire according to an embodiment of the present technology will be described below. Herein, "tire radial direction" refers to the direction orthogonal to the rotation axis of the pneumatic tire, "inner side in the tire radial direction" refers to a side toward the rotation axis in the tire radial direction, and "outer side in the tire radial direction" refers to a side away from the rotation axis in the tire radial direction. In addition, "tire circumferential direction" refers to the circumferential direction with the rotation axis as the center axis. Moreover, "tire width direction" refers to a direction parallel to the rotation axis, "inner side in the tire width direction" refers to a side toward a tire equatorial plane (tire equator line) in the tire width direction, and "outer side in the tire width direction" refers to a side away from the tire equatorial plane in the tire width direction. Note that "tire equatorial plane" refers to the plane orthogonal to the rotation axis of the pneumatic tire, the plane passing through the center of the tire width of the pneumatic tire.

Figure 1:
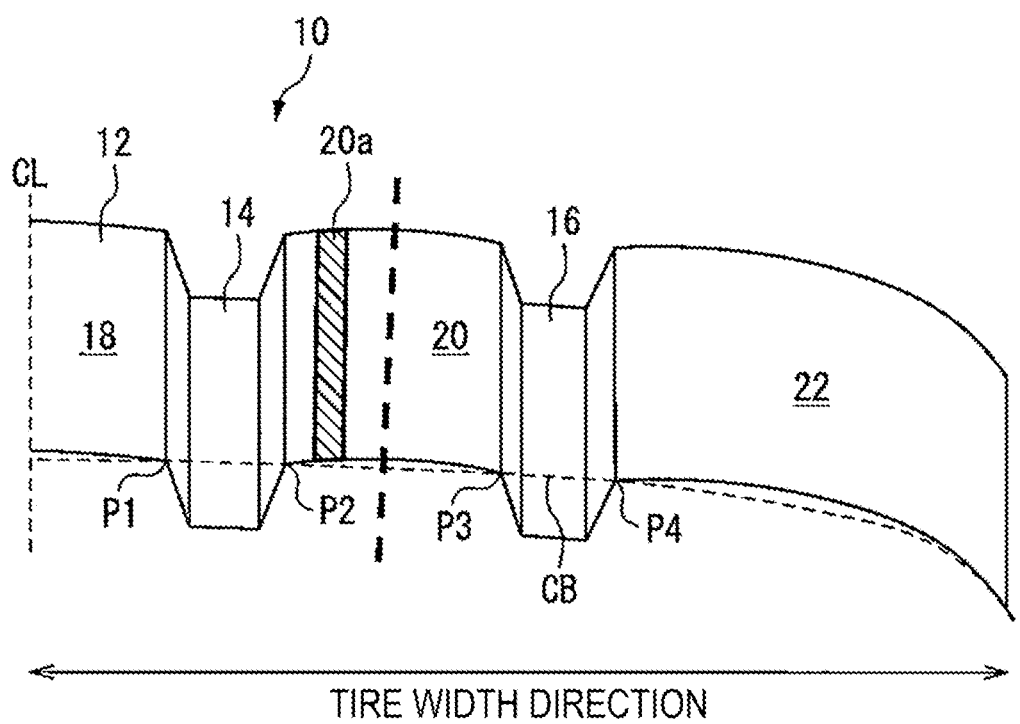
FIG. 1 is a perspective view of a tread portion of a pneumatic tire according to an embodiment of the present technology.

FIG. 1 is a perspective view of a tread portion of a pneumatic tire according to an embodiment of the present technology. FIG. 1 illustrates one side of a tread portion 10 demarcated by a tire equatorial plane CL, and the tread portion 10 includes a rubber material (tread rubber) and is exposed on the outermost side of the pneumatic tire in the tire radial direction, with the surface of the tread portion 10 constituting the contour of the pneumatic tire. The surface of the tread portion 10 is formed as a tread surface 12, corresponding to a surface that comes into contact with a road surface during traveling of a vehicle (not illustrated) mounted with the pneumatic tire.

The tread surface 12 includes at least one land portion 18, 20 or 22 (FIG. 1 illustrates three land portions on one side of a tire equator surface CL) defined and formed by at least two circumferential main grooves 14 and 16 (FIG. 1 illustrates two circumferential main grooves on one side of the tire equatorial plane CL), the land portions 18, 20 and 22 being disposed in order from the inner side to the outer side in the tire width direction.

Additionally, in the example illustrated in FIG. 1, at least one of the land portions 18, 20 or 22 (land portion 20 in FIG. 1) is a bulging land portion bulging toward the outer side in the tire radial direction with respect to a reference arc CB described in detail below. Note that a thick dotted line illustrated in FIG. 1 is a line passing through the bulging apex position of the bulging land portion 20.

Here, the reference arc is an arc passing through at least three of four opening ends P1, P2, P3, and P4 of circumferential main grooves 14 and 16 adjacent to the land portion 20 on both sides in the tire width direction of the land portion 20 in FIG. 1, and including a center located further on the inner side than the opening ends in the tire radial direction and having a maximum radius of curvature (in FIG. 1, an arc CB illustrated by a dotted line) (reference arc 1).

Note that the land portion 22 illustrated in FIG. 1 is not a bulging land portion, but in a configuration where a reference arc is set in a case where no groove is present on one side of the land portion in the tire width direction as in the land portion 22, the reference arc is an arc passing through two adjacent opening ends (in the land portion 22, the opening ends P3 and P4) of the circumferential main groove on one side of the land portion in the tire width direction and passing through a ground contact edge not illustrated, the arc including a center located further on the inner side than the opening ends and the ground contact edge in the tire radial direction and having a maximum radius of curvature (reference arc 2).

Also, for either of the reference arcs 1 and 2 described above, in a case where the ends of the land portion in the tire width direction include respective chamfered portions, outermost points of the chamfered portions in the tire radial direction are defined as opening ends of adjacent grooves, and a reference arc is set as described in the sections of the reference arcs 1 and 2. (reference arc 3).

Now, the tread portion 10 illustrated in FIG. 1 is formed of non-electrically-conductive rubber and electrically conductive rubber. Here, the non-electrically-conductive rubber is not particularly limited as long as the non-electrically-conductive rubber includes normal rubber for tire molding (e.g., natural rubber (NR), styrene-butadiene rubber (SBR), butadiene rubber (BR), isoprene rubber (IR), and butyl rubber, and the like), and a prescribed compounding agent (carbon black, silica, oil, resin, anti-aging agent, zinc oxide, stearic acid, vulcanization accelerator, sulfur, and the like). However, in a case where the rolling resistance performance is focused on, it is crucial to use low heat-generating compound having a relatively low blended amount of carbon black.

In contrast, as the electrically conductive rubber, rubber can be used that includes the above-described materials of the non-electrically-conductive rubber mixed with a filler (electrically conductive filler) including a fine powdery electrically conductive material in order to ensure electrical conductivity. A representative example of the filler is carbon black, and by adjusting the added amount of carbon black, electrical conductivity performance can be adjusted. Additionally, various metal powders can also be used as fillers.

Figure 2:
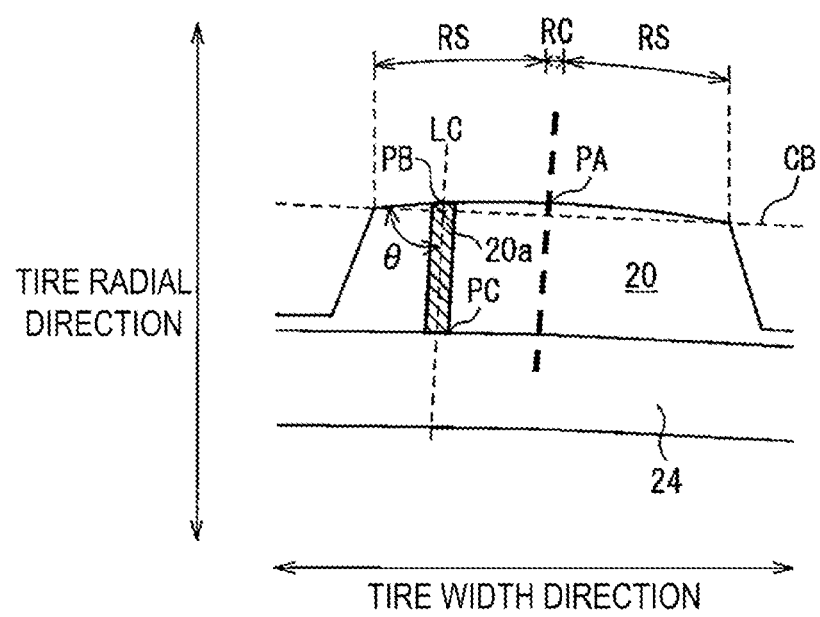
FIG. 2 is a tire meridian cross-sectional view of a bulging land portion illustrated in FIG. 1.

FIG. 2 is a tire meridian cross-sectional view of the bulging land portion 20 illustrated in FIG. 1, and more specifically, is a tire meridian cross-sectional view of the bulging land portion 20 when the tire is mounted on a regular rim (not illustrated), inflated to a regular internal pressure, and in an unloaded state. Note that a thick dotted line illustrated in FIG. 2 is a line passing through the bulging apex position of the bulging land portion 20.

Here, "regular rim" refers to an "applicable rim" defined by the JATMA (Japan Automobile Tyre Manufacturers Association, Inc.), a "Design Rim" defined by the TRA (Tire & Rim Association, Inc.), or a "Measuring Rim" defined by the ETRTO (European Tyre and Rim Technical Organisation). Additionally, "regular internal pressure" refers to a "maximum air pressure" defined by the JATMA, to the maximum value in "TIRE LOAD LIMITS AT VARIOUS COLD INFLATION PRESSURES" defined by the TRA, or to "INFLATION PRESSURES" defined by the ETRTO.

Given the configuration described above, in the pneumatic tire according to an embodiment of the present technology, as illustrated in FIG. 2, electrically conductive rubber 20a is formed in a region RS corresponding to the bulging land portion 20 except for a region RC with a width of 5% of the width of the bulging land portion 20 along a tire profile and being centered at the bulging apex position PA bulging most toward the outer side of the bulging land portion 20 in the tire radial direction. Note that the rubber constituting the tread portion 10, except for the electrically conductive rubber 20a of the bulging land portion 20, is formed from the non-electrically-conductive rubber.

Effects

In an embodiment of the present technology, as illustrated in FIGS. 1 and 2, the bulging land portion 20 is present that bulges toward the outer side in the tire radial direction with respect to the reference arc CB. Thus, the ground contact patch shape of the tire can be made uniform particularly in the tire width direction, and excellent drainage performance can be achieved (effect 1). Note that a bulging amount from the reference arc CB is preferably 0.1 mm or more, and more preferably 0.2 mm or more, in view of drainage performance. In contrast, in view of a uniform ground contact patch shape of the tire, the bulging amount from the reference arc CB is preferably 2.5 mm or less, and more preferably 0.5 mm or less.

Additionally, in an embodiment of the present technology, for example, non-electrically-conductive rubber containing silica is formed in all regions of the tread portion 10 other than the electrically conductive rubber 20a of the bulging land portion 20. Accordingly, the rolling resistance coefficient (RRC) can be reduced to achieve excellent rolling resistance performance (effect 2).

Furthermore, in an embodiment of the present technology, as illustrated in FIG. 2, the electrically conductive rubber 20a is formed in the region RS corresponding to the bulging land portion 20 except for the region RC with a width of 5% of the width of the bulging land portion 20 and being centered at the bulging apex position PA bulging most toward the outer side of the bulging land portion 20 in the tire radial direction (specifically, the region RS is located on at least one side of the position PA). That is, in the example illustrated in FIG. 2, the electrically conductive rubber 20a is formed at a position offset from the bulging apex position PA in the tire width direction. Thus, the outer surface in the tire radial direction of the electrically conductive rubber 20a is not a region contacted by a mold at the end of vulcanization, thus allowing unvulcanized rubber, which is non-electrically-conductive, to be prevented from flowing onto the outer surface. Consequently, in the example illustrated in FIG. 2, the electrically conductive portion, which should originally be exposed, is reliably exposed even after vulcanization, ensuring excellent electrical conductive performance particularly in a case where the tire is new (effect 3). Note that, in a case where the electrically conductive rubber 20a is formed in the region excluding the 10% wide region RC of the bulging land portion 20 and being centered at the bulging apex position PA, the non-conductive unvulcanized rubber can be reliably prevented from flowing onto the surface of the electrically conductive rubber, and even more excellent electrical conductive performance is ensured when the tire is new. Note that, to ensure a sufficient effect of formation of the electrically conductive rubber 20a, all the formation positions of the electrically conductive rubber 20a, including the tire surface at the time when the tire is new and positions in the tire radial direction which become a surface at the terminal stages of wear when a wear indicator appears, correspond to the region corresponding to the bulging land portion 20 except for the region with a width of 5% of the width of the bulging land portion 20 and being centered at the bulging apex position PA.

Consequently, in the pneumatic tire according to an embodiment of the present technology, by particularly improving the formation region of the electrically conductive rubber in the bulging land portion, effects 1 to 3 described above are combined together to allow electrical conductive performance to be enhanced, while maintaining wet steering stability performance and rolling resistance performance.

Additionally, the total circumferential length (dimension in the tire circumferential direction, the same applies hereinafter) of the electrically conductive rubber 20a illustrated in FIGS. 1 and 2 in the tire circumferential direction is 5% or more of the total circumferential length of the bulging land portion 20 in the tire circumferential direction. This particularly enhances electrical conductivity performance to allow reliable discharge of static electricity from the tire internal structure to the road surface.

Although not entirely illustrated, the pneumatic tire according to an embodiment of the present technology described above has the identical meridian cross-sectional shape as a conventional pneumatic tire. In other words, in a meridian cross-sectional view, the pneumatic tire according to an embodiment of the present technology includes bead portions, sidewall portions, shoulder portions, and the tread portion in that order from the inner side to the outer side in the tire radial direction. For example, in a meridian cross-sectional view, the pneumatic tire includes a carcass layer that extends from the tread portion to the bead portions on both sides and is wound around a pair of bead cores, and a belt layer and belt cover layer on the outer side in the tire radial direction of the carcass layer.

Additional Embodiments

Now, Additional Embodiments 1 to 6 that can optionally be implemented on Basic Embodiment of the pneumatic tire according to an embodiment of the present technology will be described.

Additional Embodiment 1

Figure 3:
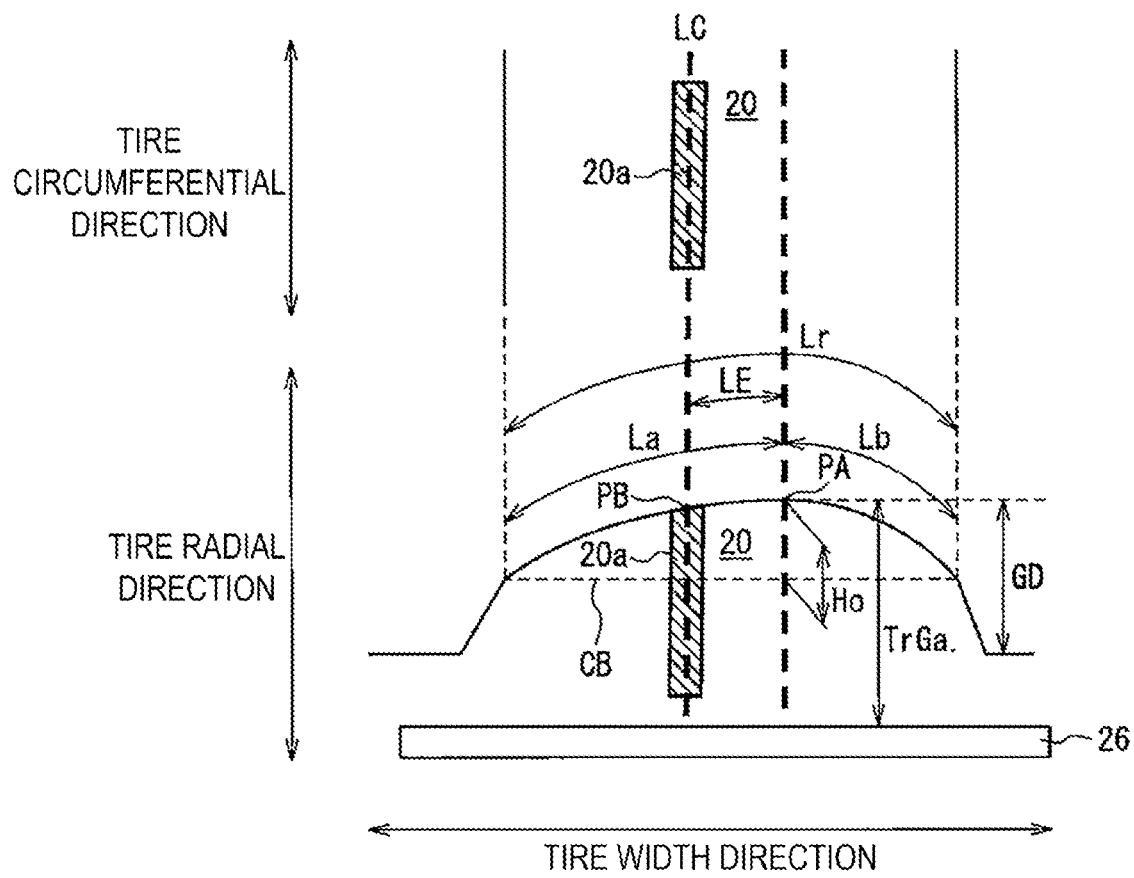
FIG. 3 is a diagram illustrating an example of the formation position of electrically conductive rubber included in the bulging land portion illustrated in FIG. 2.

FIG. 3 is a diagram illustrating an example of the formation position of the electrically conductive rubber 20a included in the bulging land portion 20 illustrated in FIG. 2. An upper portion of FIG. 3 illustrates the formation position of the electrically conductive rubber 20a in a plan view of the bulging land portion 20, and a lower portion of FIG. 3 illustrates the formation position of the electrically conductive rubber 20a in a tire meridian cross-sectional view of the bulging land portion 20. Note that for the position in the tire width direction, the upper portion of FIG. 3 aligns with the lower portion of FIG. 3.

In Basic Embodiment, as illustrated in the lower portion of FIG. 3, $$LE \geq (0.05 \times Lr/2) + (GD/TrGa) \times (Ho/Lr) \times La$$

is preferably satisfied,
where variables are, in a tire meridian cross-sectional view, a dimension LE along the tire profile from the bulging apex position PA to the center position PB of the electrically conductive rubber 20a in the tire width direction, the overall dimension Lr of the bulging land portion 20 along the tire profile, the depth GD of the circumferential main groove close to the bulging apex position PA, a tread gauge TrGa down to a belt layer 26 at the bulging apex position PA, the bulging amount Ho from the reference arc CB at the bulging apex position PA, and the dimension La of the bulging land portion along a profile line on a side having a larger dimension in the tire width direction, the side being demarcated by the bulging apex position PA (Additional Embodiment 1).

Note that reference sign Lb in FIG. 3 indicates the dimension of the bulging land portion 20 along the profile line on a side having a smaller dimension in the tire width direction, the side being demarcated by the bulging apex position PA.

Here, in the inequality described above, the term ($0.05 \times Lr/2$) signifies that "the 5% region along the profile, the region being centered at the bulging apex position PA, corresponds to a formation prohibition region of the electrically conductive rubber." Also, the quotient (GD/TrGa) signifies "groove depth ratio." Furthermore, quotient (Ho/Lr) signifies "the degree of bulging of the bulging land portion 20." In addition, the value La signifies, as described above, the dimension along the profile line on the side having a larger dimension in the tire width direction, the side being demarcated by the bulging apex position PA as a boundary. Note that, the results of the analysis, by the inventors, of the relationship between the value La and a large number of experimental data related to the dimension LE indicate that the value La is a correction value reasonably incorporated into the right side of the inequality as a part of the inequality. Note that, in FIG. 3, the inequality is set such that the value LE increases as each of the bulging amount of the bulging land portion 20, the dimension of the bulging land portion 20 in the tire width direction, the depth of the circumferential main groove close to the bulging apex position PA, and the groove depth of the circumferential main groove with respect to the tread gauge TrGa increases.

Typically, rubber flow during vulcanization tends to increase as the indicator "groove depth ratio" and/or the indicator "degree of bulging of the bulging land portion 20" increases. Thus, the inventors have obtained the knowledge that it is proper to make the dimension LE greater than a value obtained by multiplying the product of the above-described indicators by the correction value La and further adding, to the resultant product, the term ($0.05 \times Lr/2$), indicating the formation prohibition region of the electrically conductive rubber. As described above, satisfying the inequality described above leads to a very low possibility that the outer surface of the electrically conductive rubber 20a in the tire radial direction is a region contacted by the mold at the end of vulcanization, and further allows unvulcanized rubber to be prevented, at a higher level, from flowing onto the outer surface.

Note that in Additional Embodiment 1, in the case where the dimension LE in the lower portion of FIG. 3 is larger than the dimension La, a land portion end portion located farther in the tire width direction from the center position PB of the electrically conductive rubber 20a in FIG. 3 (the end portion on the right side in FIG. 3) is used as the land portion end portion, and in the inequality, the dimension Lb is used instead of the dimension La.

Additional Embodiment 2

In Basic Embodiment or Basic Embodiment in combination with Additional Embodiment 1, as illustrated in FIG. 2, in a tire meridian cross-sectional view, the dimension of the electrically conductive rubber 20a in the tire width direction is preferably 2% or more and 50% or less of the dimension Lr illustrated in FIG. 3 at any position in tire radial direction from the tread surface to at least an outer position of an undertread 24 in the tire radial direction (position PC in FIG. 2) (Additional Embodiment 1). Note that the region on the outer side from reference sign 24 in the tire radial direction in FIG. 2 is the formation region of the cap tread.

The dimension described above is 2% or more of the dimension Lr illustrated in FIG. 3 at any position in the tire radial direction from the tire surface to the position PC, enabling a further reduction in the electrical resistance across all of the tread portion 10. This in turn allows electrical conductivity performance to be further enhanced. In contrast, The dimension described above is 50% or less of the dimension Lr illustrated in FIG. 3 at any position in the tire radial direction from the tire surface to the position PC, allowing avoidance of an excessive decrease in the rate of non-electrically-conductive rubber, which is relatively light, to further enhance rolling resistance performance.

Note that the dimension described above is 3% or more and 15% or less of the dimension Lr illustrated in FIG. 3 at any position in the tire radial direction from the tire surface to the position PC, and thus each of the effects described above is achieved at a considerably higher level.

In addition, the electrically conductive rubber 20a may be formed from the tire surface 12 to any position in the tire radial direction at inner position in the tire radial direction within the region of the cap tread and the undertread. However, to make the electrical conductivity of the tread portion 10 extremely high, the electrically conductive rubber 20a is preferably formed down to the inner end portion of the undertread in the tire radial direction.

Furthermore, the electrically conductive rubber 20a may be shaped such that the dimension in the tire width direction varies with the position in the tire radial direction. In this case, in a tire meridian cross-sectional view, the outer contour of the electrically conductive rubber 20a may be defined by a straight line or a curved line, or may be defined by a plurality of straight lines and/or curved lines.

Additional Embodiment 3

In Basic Embodiment or Basic Embodiment in combination with at least one of Additional Embodiments 1 or 2, as illustrated in FIG. 2, in a tire meridian cross-sectional view, an angle $\theta$ formed between the reference arc CB and a center line LC of the electrically conductive rubber 20a in the tire width direction is preferably 60° or more and 90° or less (Additional Embodiment 3). Here, in view of the fact that the reference arc CB is substantially curved line, in actuality, the angle θ is measured with the reference arc CB replaced with a straight line connecting the center position PB of the electrically conductive rubber 20a in the tire width direction and the end portion of the bulging land portion closer to the position PB.

By setting the angle θ formed to 60° or more, the electrically conductive rubber 20a can be reliably prevented from being caught in the non-electrically-conductive rubber around the electrically conductive rubber 20a during vulcanization. Also, by setting the angle θ formed to 60° or more, the interface between the electrically conductive rubber and the non-electrically-conductive rubber is enlarged, and thus the electrically conductive rubber 20a and the non-electrically-conductive rubber can be reliably prevented from peeling from each other.

Also, as described above, in view of reliable prevention of the electrically conductive rubber 20a from being caught in the non-electrically-conductive rubber around the electrically conductive rubber 20a during vulcanization, and the like, the angle θ formed is preferably as large as possible. Thus, in Additional Embodiment 3, the angle θ formed is 90° or less.

Additional Embodiment 4

In Basic Embodiment or Basic Embodiment in combination with at least one of Additional Embodiments 1 to 3, the electrically conductive rubber 20a is preferably formed in a region having a width of 50% of the ground contact width and being centered at the tire equatorial plane CL (Additional Embodiment 4).

Normally, the tire equatorial plane CL and a region in the vicinity of the tire equatorial plane CL are regions having the highest possibility of contact with the road surface. Thus, by forming the electrically conductive rubber 20a in a region having a width of 50% of the ground contact width and being centered at the tire equatorial plane CL, more reliable contact of the electrically conductive rubber 20a with the road surface is ensured, thus allowing electrical conductivity performance to be further enhanced.

Note that in a case where the electrically conductive rubber 20a is formed in a region having a width of 45% of the ground contact width and being centered at the tire equatorial plane CL, the effect described above is more preferably achieved at a higher level. In a case where the electrically conductive rubber 20a is formed in a region with a width of 40% of the ground contact width, the effect described above is much more preferably achieved at a very high level.

Additional Embodiment 5

Figure 4:
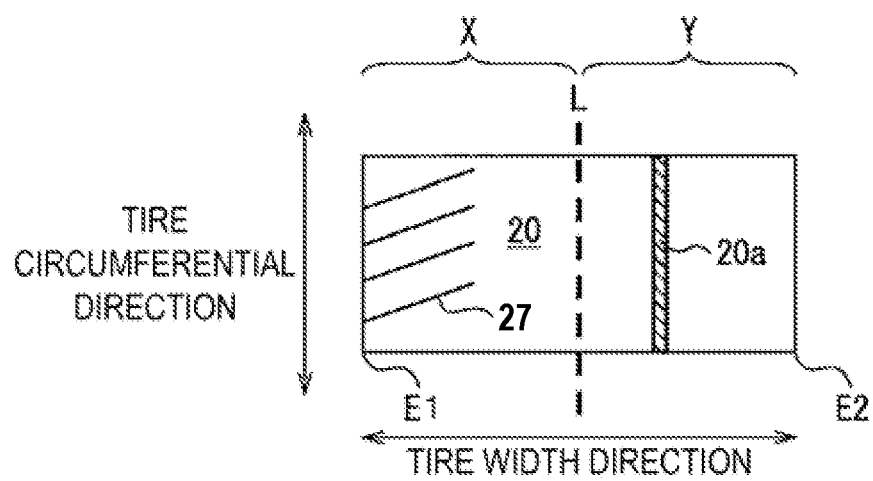
FIG. 4 is a plan view of a bulging land portion according to an embodiment of the present technology.

FIG. 4 is a plan view of the bulging land portion according to an embodiment of the present invention. In FIG. 4, reference signs E1 and E2 denote end portions of the bulging land portion 20 in the tire width direction, and reference numeral 27 denotes four narrow grooves (or sipes) inclined with respect to the tire width direction and extending from one end E1 of the bulging land portion 20 and terminate within the land portion. In Basic Embodiment or Basic Embodiment in combination with at least one of Additional Embodiments 1 to 4, as illustrated in FIG. 4, the electrically conductive rubber 20a is preferably formed in a region Y of regions X and Y demarcated by a center line L of the bulging land portion 20 in the tire width direction, the region Y having a small groove area ratio (Additional Embodiment 5). Note that in the example illustrated in FIG. 4, four narrow grooves (or sipes) are formed in the region X, but no grooves (or sipes) are formed in the region Y, and thus the region Y is a region having a small groove area ratio.

As illustrated in FIG. 4, the electrically conductive rubber 20a is formed in the region Y having a small groove area in a case where the center line L is used as a boundary for the region Y, that is, the region where the ground contact pressure is more uniform. As a result, the electrically conductive rubber 20a is more grounded, thus allowing electrical conductivity to be further increased.

Note that in a case where the groove area ratio is equal in the two regions demarcated by the center line L, the electrically conductive rubber 20a can be formed in either of the regions. However, in this case, the electrically conductive rubber 20a is more preferably formed in the region where the bulging apex position is not present. This is because the possibility is reduced that the electrically conductive rubber 20a is the region contacted by the mold at the end of vulcanization, and thus that the unvulcanized rubber flows onto the surface of the electrically conductive rubber 20a.

Furthermore, in a case where the two regions demarcated by the center line L have an equal groove area ratio and where the bulging apex position is present in the center of the bulging land portion in the tire width direction, the electrically conductive rubber 20a is more preferably formed in the region closer to the tire equatorial plane CL. This is typically because the vicinity of the tire equatorial plane CL is the highest position for the ground contact pressure in the tire width direction, allowing more efficient discharge of electrostatic electricity from the tire internal structure to the road surface.

Additional Embodiment 6

In Basic Embodiment or Basic Embodiment in combination with at least one of Additional Embodiments 1 to 5, the electrically conductive rubber preferably has a volume resistivity value of less than $10 \times 10^8$ Ω·cm (Additional Embodiment 6). Here, the volume resistivity value is a value measured using a sample of 15-square-cm rubber having a thickness of 2 mm and using an electric resistance measuring instrument at an applied voltage of 500 V, an air temperature of 25° C., and a humidity of 50%.

By setting the volume resistivity value of the electrically conductive rubber to less than $10 \times 10^8$ Ω·cm, electrical conductivity performance can further be enhanced to reliably discharge static electricity from the tire internal structure to the road surface. Note that the volume resistivity value of the electrically conductive rubber being less than $5 \times 10^8$ Ω·cm more preferably allows the effect described above to be achieved at a higher level and that the volume resistivity value of the electrically conductive rubber being less than $1 \times 10^8$ Ω·cm much preferably allows the effect described above to be achieved at a very high level.

Green Tire Manufacturing Method

Now, a green tire manufacturing method will be explained.

The green tire manufacturing method according to an embodiment of the present technology is the method that is used in manufacturing the pneumatic tire described above (Basic Embodiment and Additional Embodiments 1 to 6).

The green tire manufacturing method according to an embodiment of the present technology includes, as with a known manufacturing method, bonding a tire component including a carcass and a belt onto a core having an outer surface shape generally corresponding to an inner surface shape of a manufactured tire, and then forming, on an outer side of the belt in the tire radial direction, a tread obtained by extruding and integrally molding undertread rubber and cap tread rubber.

Given such a series of manufacturing processes, in the green tire manufacturing method according to an embodiment of the present technology, in particular, electrically conductive rubber is formed in a region corresponding to a portion corresponding to the bulging land portion except for a region with a width of 1 to 3% of the width of the portion corresponding to the bulging land portion, the portion that corresponds to the bulging land portion being centered at the position of the integral tread corresponding to the bulging apex position of the manufactured tire and including at least a region of the cap tread rubber in the integral tread.

Figure 5:
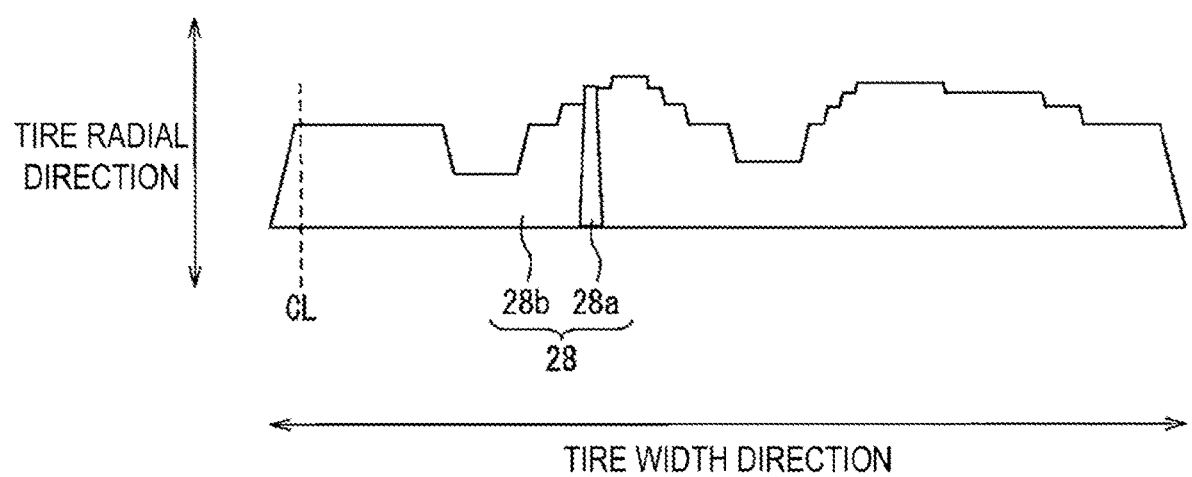
FIG. 5 is a tire meridian cross-sectional view illustrating a tread portion of a manufactured tire obtained by vulcanization after implementing a green tire manufacturing method according to an embodiment of the present technology.

FIG. 5 is a tire meridian cross-sectional view illustrating a tread portion of a manufactured tire obtained by vulcanization after implementing the green tire manufacturing method according to an embodiment of the present technology. The vulcanization is implemented by forming, on an inner wall of a vulcanization mold, for example, protrusion portions and recess portions corresponding to the grooves and the land portions illustrated in FIG. 1, and using the mold to control a tread pattern. In the manufactured tire obtained through the vulcanization steps as described above after implementing the green tire manufacturing method as described above, as illustrated in FIG. 5, electrically conductive rubber 28a and non-electrically-conductive rubber 28b are disposed at predetermined positions in tread rubber 28. Thus, the pneumatic tire illustrated in FIGS. 1 to 4 can be obtained.

This is because, in the green tire, the formation region of the electrically conductive rubber is located offset, in advance, from a position corresponding to the bulging apex position of the manufactured tire, thus preventing the outer surface of the electrically conductive rubber in the tire radial direction from being the region contacted by the mold at the end of vulcanization. This in turn allows the unvulcanized rubber to be reliably prevented from flowing onto the outer surface.

Note that the formation prohibition region of the electrically conductive rubber in the tire width direction of the above-described integral tread used in manufacturing a green tire is preferably approximately 1% smaller than the formation prohibition region of the electrically conductive rubber in the manufactured tire in the tire width direction. This is because in connection with the vulcanization steps, the electrically conductive rubber has a less contraction percentage than the non-electrically-conductive rubber, and the value described above is determined in view of the blended amount of electrically conductive filler blended into the electrically conductive rubber according to an embodiment of the present technology.

EXAMPLE

Pneumatic tires, having a tire size of 195/65R15 91H, according to Conventional Example and Examples 1 to 7 having a shape illustrated in at least one of FIGS. 1 to 4 were manufactured. Note that the detailed conditions of these pneumatic tires are as shown in Tables 1 and 2 below. Note that, in Tables 1 and 2, LE (mm) denotes a dimension along the tire profile from the bulging apex position to the center position of the electrically conductive rubber in the tire width direction, Lr (mm) denotes the overall dimension of the bulging land portion along the tire profile, GD (mm) denotes the depth of the circumferential main groove closest to the bulging apex position, TrGa (mm) denotes the tread gauge at the bulging apex position, Ho (mm) denotes the bulging amount from the reference arc at the bulging apex position, and La (mm) denotes the dimension of the bulging land portion along the profile line on the side having a larger dimension in the tire width direction, the side being demarcated by the bulging apex position. Also, in Tables 1 and 2, the angle $\theta(°)$ signifies the angle formed by the reference arc and the center line of the electrically conductive rubber in the tire width direction in a tire meridian cross-sectional view. Note that the other items indicated in Tables 1 and 2 comply with the description of the present specification described above.

The pneumatic tires according to Examples 1 to 7 and the pneumatic tire according to Conventional Example manufactured as described above were evaluated for wet steering stability performance, rolling resistance performance, and electrical conductivity performance in accordance with the following procedures. Note that all performance evaluations were conducted on test tires mounted on rims having a size of 15×6.5 J and inflated to an air pressure of 230 kPa.

Wet Steering Stability Performance

A test vehicle (engine displacement of 2000 cc) was driven on a test course of a wet road surface, a feeling evaluation test on steering stability performance was conducted by a test driver, and the results are expressed as index values and evaluated, with Conventional Example being assigned as an index value of 100 (reference). The results are shown in Tables 1 and 2. Note that larger values indicate more excellent wet steering stability performance.

Rolling Resistance Performance

An indoor drum testing machine was used, and the resistance at 50 km/h was measured with each test tire loaded with a load of 4 kN, and expressed as index values and evaluated, with Conventional Example being assigned as an index value of 100 (reference). The results are shown in Tables 1 and 2. Note that larger values indicate more excellent rolling resistance performance.

Electrical Conductivity Performance

For each test tire, an ultra high resistance meter (R8340A) available from Advantest Inc. was used to measure an electrical resistance value between the tread portion and the bead portion, the reciprocal of the electrical resistance value was determined, and expressed as index values and evaluated, with Conventional Example being assigned as an index value of 100 (reference). The results are shown in Tables 1 and 2. Note that larger values indicate more excellent electrical conductivity performance.

TABLE 1

|  | Conventional Example | Example 1 | Example 2 | Example 3 | Example 4 |
| --- | --- | --- | --- | --- | --- |
| Electrically conductive rubber is formed in region corresponding to bulging land portion except for region having width of what % of width of bulging land portion and being centered at bulging apex position? (%) | 0 | 3 | 3 | 3 | 3 |
| LE (mm) | 0 | 0.2 | 0.7 | 0.7 | 0.7 |
| Lr (mm) | 20 | 20 | 20 | 20 | 20 |
| GD (mm) | 7.2 | 7.2 | 7.2 | 7.2 | 7.2 |
| TrGa (mm) | 9.0 | 9.0 | 9.0 | 9.0 | 9.0 |
| Ho (mm) | 0.4 | 0.4 | 0.4 | 0.4 | 0.4 |
| La (mm) | 10 | 10 | 10 | 10 | 10 |
| Is LE ≥ (0.05 × Lr/2) + (GD/TrGa) × (Ho/Lr) × La satisfied? | Not satisfied | Not satisfied | Satisfied | Satisfied | Satisfied |
| What % of dimension Lr is dimension of electrically conductive rubber in tire width direction at any position in tire radial direction from tread surface to at least outer position of undertread in tire radial direction? | 1 | 1 | 1 | 10 | 10 |
| Angle θ formed (°) | 60 | 60 | 60 | 60 | 70 |
| What % of ground contact width (%) is dimension from tire equatorial plane to electrically conductive rubber? | 30 | 30 | 30 | 30 | 30 |
| Which of regions X and Y in FIG. 4 is electrically conductive rubber formed in? | Both | Region X | Region X | Region X | Region X |
| Volume resistivity value of electrically conductive rubber? (Ω · cm) | $30 \times 10^8$ | $30 \times 10^8$ | $30 \times 10^8$ | $30 \times 10^8$ | $30 \times 10^8$ |
| Wet steering stability performance | 100 | 100 | 100 | 100 | 100 |
| Rolling resistance performance | 100 | 100 | 100 | 100 | 100 |
| Electrical conductivity performance | 100 | 102 | 103 | 104 | 105 |
| Durability Performance | 100 | 100 | 100 | 100 | 103 |

TABLE 2

|  | Conventional Example | Example 5 | Example 6 | example 7 |
| --- | --- | --- | --- | --- |
| Electrically conductive rubber is formed in region corresponding to bulging land portion except for region having width of what % of width of bulging land portion and being centered at bulging apex position? (%) | 0 | 3 | 3 | 3 |
| LE (mm) | 0.7 | 0.7 | 0.7 | 0.7 |
| Lr (mm) | 20 | 20 | 20 | 20 |
| GD (mm) | 7.2 | 7.2 | 7.2 | 7.2 |
| TrGa (mm) | 9.0 | 9.0 | 9.0 | 9.0 |
| Ho (mm) | 0.4 | 0.4 | 0.4 | 0.4 |
| La (mm) | 10 | 10 | 10 | 10 |
| Is LE ≥ (0.05 × Lr/2) + (GD/TrGa) × (Ho/Lr) × La satisfied? | Not satisfied | Satisfied | Satisfied | Satisfied |
| What % of dimension Lr is dimension of electrically conductive rubber in tire width direction at any position in tire radial direction from tread surface to at least outer position of undertread in tire radial direction? | 1 | 10 | 10 | 10 |
| Angle θ formed (°) | 60 | 70 | 70 | 70 |
| What % of ground contact width (%) is dimension from tire equatorial plane to electrically conductive rubber? | 30 | 25 | 25 | 25 |

TABLE 2-continued

|  | Conventional Example | Example 5 | Example 6 | example 7 |
|---|---|---|---|---|
| Which of regions X and Y in FIG. 4 is electrically conductive rubber formed in? | Both | Region X | Legion Y | Legion Y |
| Volume resistivity value of electrically conductive rubber ($\Omega \cdot $cm) | $30 \times 10^8$ | $30 \times 10^8$ | $30 \times 10^8$ | $30 \times 10^8$ |
| Wet steering stability performance | 100 | 100 | 100 | 100 |
| Rolling resistance performance | 100 | 100 | 100 | 100 |
| Electrical conductivity performance | 100 | 105 | 106 | 107 |

Tables 1 and 2 indicate that each of the pneumatic tires according to Examples 1 to 7 that belong to the technical scope of the present technology (that is, the pneumatic tires in which the formation region of the electrically conductive rubber in the bulging land portion is improved) can provide excellent electrical conductivity performance while maintaining wet steering stability performance and rolling resistance performance compared to the pneumatic tires according to Conventional Example that do not belong to the technical scope of the present technology.

The invention claimed is:

1. A pneumatic tire comprising at least two circumferential main grooves and at least two land portions defined and formed by the at least two circumferential main grooves, the at least two land portions comprising a center land portion positioned on a tire equator and a bulging land portion bulging toward an outer side in a tire radial direction with respect to a reference arc, the bulging land portion being offset from the tire equator, the pneumatic tire further comprising a tread portion formed of non-electrically-conductive rubber and electrically conductive rubber, integrally molded and vulcanized together to form the tread portion,
   wherein when the pneumatic tire is mounted on a regular rim, inflated to a regular internal pressure, and in an unloaded state, in a tire meridian cross-sectional view, the electrically conductive rubber being formed in a region corresponding to the bulging land portion except for a region with a width of 5% of a width of the bulging land portion and being centered at a bulging apex position bulging most toward an outer side of the bulging land portion in the tire radial direction, the region in which the electrically conductive rubber is formed being offset from a center of the bulging land portion in a tire width direction,
   wherein LE≥(0.05×Lr/2)+(GD/TrGa)×(Ho/Lr)×La is satisfied, where variables are, in a tire meridian cross-sectional view, a dimension LE along a tire profile from the bulging apex position to a center position of the electrically conductive rubber in the tire width direction, an overall dimension Lr of the bulging land portion along the tire profile, a depth GD of the circumferential main groove close to the bulging apex position, a tread gauge TrGa at the bulging apex position, a bulging amount Ho from the reference arc at the bulging apex position, and a dimension La of the bulging land portion along a profile line on a side having a larger dimension in the tire width direction, the side being demarcated by the bulging apex position, and
   wherein the reference arc being an arc passing through at least three of four opening ends of two circumferential main grooves adjacent to the bulging land portion in the tire width direction and comprising a center located further on an inner side than the opening ends in the tire radial direction and having a maximum radius of curvature, or
   the reference arc being an arc passing through two opening ends and a ground contact edge of a circumferential main groove adjacent to the bulging land portion on the inner side in the tire width direction and comprising a center located further on the inner side than the opening ends in the tire radial direction and having a maximum radius of curvature.

2. The pneumatic tire according to claim 1, wherein in a tire meridian cross-sectional view, a dimension of the electrically conductive rubber in the tire width direction is 2% or more and 50% or less of a dimension Lr of the bulging land portion along the tire profile at any position in tire radial direction from a tread surface to at least an outer position of an undertread in the tire radial direction.

3. The pneumatic tire according to claim 2, wherein in a tire meridian cross-sectional view, an angle θ formed by the reference arc and a center line of the electrically conductive rubber in the tire width direction is 60° or more and 90° or less.

4. The pneumatic tire according to claim 3, wherein the electrically conductive rubber is formed in a region with a width of 50% of a ground contact width, the region being centered at a tire equatorial plane.

5. The pneumatic tire according to claim 4, wherein the electrically conductive rubber is formed in the region having a small groove area ratio in regions on one side of the bulging land portion in the tire width direction, the side being demarcated by the center line in the tire width direction.

6. The pneumatic tire according to claim 5, wherein the electrically conductive rubber has a volume resistivity value of less than $10 \times 10^8$ $\Omega$·cm.

7. A green tire manufacturing method according to an embodiment, the method being used in manufacturing the pneumatic tire according to claim 6, the method comprising the steps of:
   bonding a tire component comprising a carcass and a belt onto a core having an outer surface shape generally corresponding to an inner surface shape of a manufactured tire;
   extrusion-molding undertread rubber and cap tread rubber into an integral tread; and
   bonding the integral tread onto the belt,
   electrically conductive rubber being formed in a region corresponding to a portion corresponding to the bulging land portion except for a region with a width of 1 to 3% of a width of the portion corresponding to the bulging land portion, the portion that corresponds to the bulging land portion being centered at the position of the integral tread corresponding to the bulging apex position of the manufactured tire and comprising at least a region of the cap tread rubber in the integral tread.

8. The pneumatic tire according to claim 1, wherein in a tire meridian cross-sectional view, an angle θ formed by the reference arc and a center line of the electrically conductive rubber in the tire width direction is 60° or more and 90° or less.

9. The pneumatic tire according to claim 1, wherein the electrically conductive rubber is formed in a region with a width of 50% of a ground contact width, the region being centered at a tire equatorial plane.

10. The pneumatic tire according to claim 1, wherein the electrically conductive rubber is formed in the region having a small groove area ratio in regions on one side of the bulging land portion in the tire width direction, the side being demarcated by a center line of the electrically conductive rubber in the tire width direction.

11. The pneumatic tire according to claim 1, wherein the electrically conductive rubber has a volume resistivity value of less than $10 \times 10^8$ Ω·cm.

12. A green tire manufacturing method according to an embodiment, the method being used in manufacturing the pneumatic tire according to claim 1, the method comprising the steps of:
bonding a tire component comprising a carcass and a belt onto a core having an outer surface shape generally corresponding to an inner surface shape of a manufactured tire;
extrusion-molding undertread rubber and cap tread rubber into an integral tread; and
bonding the integral tread onto the belt,
electrically conductive rubber being formed in a region corresponding to a portion corresponding to the bulging land portion except for a region with a width of 1 to 3% of a width of the portion corresponding to the bulging land portion, the portion that corresponds to the bulging land portion being centered at the position of the integral tread corresponding to the bulging apex position of the manufactured tire and comprising at least a region of the cap tread rubber in the integral tread.

* * * * *